April 30, 1929.  H. S. BEAN  1,710,681
MAXIMUM DEMAND LOAD REGULATOR
Filed April 2, 1927
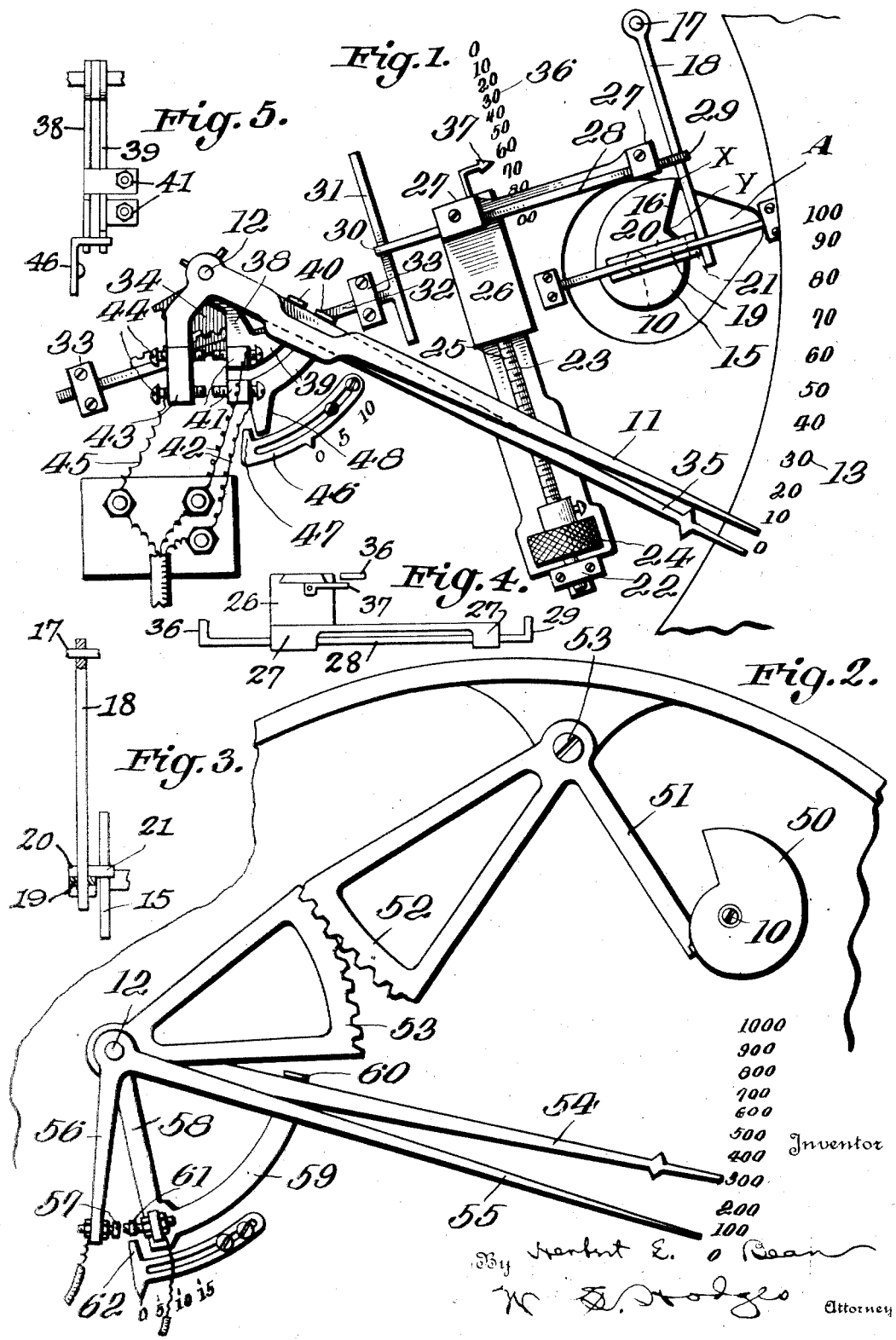
Inventor
By Herbert S. Bean
W. S. Hodges
Attorney Patented Apr. 30, 1929.

1,710,681

UNITED STATES PATENT OFFICE.

HERBERT S. BEAN, OF WILMINGTON, DELAWARE.

MAXIMUM-DEMAND-LOAD REGULATOR.

Application filed April 2, 1927. Serial No. 180,597.

This invention is a device for regulating the maximum load demand to be imposed upon an electric power line.

One of the objects of the invention is to provide an apparatus and maximum demand measuring instrument having means for automatically reducing the load when the load needle of a maximum demand instrument reaches a predetermined maximum load position during its travel. A further object is to provide an attachment of the character mentioned in which an automatic and constant regulation is maintained. A further object is to provide means by which adjustments may be made to vary the predetermined maximum load position, as changing conditions may require. A further object is to provide a load limit needle operated simultaneously with the operation of the load needle of a maximum load demand instrument, and means rendered operative when the two needles are in register to cut out the excess current from the line.

The invention will be hereinafter fully set forth and particularly pointed out in the claims.

In the accompanying drawing:—

Figure 1 is a perspective view illustrating a portion of a maximum demand measuring instrument equipped with a demand regulator constructed in accordance with the invention, the parts being set at zero positions. Figure 2 is a side elevation illustrating a slight modification. Figure 3 is a detail view illustrating the actuator member and its relation to the operating cam. Figure 4 is a detail plan view illustrating the guide carrier and slide rod. Figure 5 is a detail view illustrating the contact arms and the adjustable stop therefor.

Referring to Figure 1 of the drawing, 10 designates the time shaft of a standard type maximum demand measuring instrument, the same being geared to a clock mechanism (not shown) by which said shaft is caused to make one complete revolution in a definite period of time, such as once in every 15 minutes, or every 30 minutes, as the case may be. Said shaft extends through an opening A of any desired shape, in the front plate of the maximum demand instrument. The load limit needle of said instrument is indicated at 11, the same being secured to a shaft 12 which is moved in a predetermined relation with respect to the shaft 10, by mechanism well understood in the art and not shown. The pointer 11 is positioned to move over a scale 13, which is divided into any preferred character of indications, but for purposes of illustration it will be assumed that they are divisions of kilowatt hours. The parts thus far described are inherent parts of a well known type of maximum demand measuring instrument to which the present invention is attached, and further illustration thereof is considered unnecessary.

Secured to shaft 10 in suitable manner, is a cam 15 which has a uniform increase in radius, the point X of maximum diameter being connected with the point Y of minimum diameter by a straight shoulder 16, as shown. Suspended from a pivot 17 suitably attached to the front of the measuring instrument, is an actuator member 18, the lower end of which is mounted to move between rigidly supported guides 19, said member 18 having its lower end provided with an enlargement or follower 20, from which projects a lateral lug 21, positioned to be engaged by the curved surface of the cam 15.

Rotatably mounted in suitable bearings 22, is an adjusting shaft 23 provided with a head 24 by means of which it may be conveniently rotated. Said shaft is provided with a screw threaded portion 25, which engages a correspondingly threaded portion of a guide carrier 26 provided with guide blocks 27. The shaft 23 is so mounted that it may be readily rotated, but will be held against longitudinal movement, so that rotation of the shaft will elevate or depress the guide carrier 27, as the case may be. Extending longitudinally through the guide blocks 27 at right angles to shaft 23, is a slide rod 28, one end of which is provided with an offset lug 29 shaped to engage the member 18. The other end of the slide rod 28 is provided with an angular end 30 as shown. Said angular end 30 engages an angularly disposed arm 31, carried by rack member 32 which is slidably mounted in bearings 33. The teeth of said rack mesh with the teeth of a segment 34, which is loosely mounted upon the shaft 12, and is provided with an extension forming a "load limit" needle 35. It will be observed that the needles 11 and 35 are concentrically mounted so that both of them will move over the scale 13, but that they are movable independently of each other. Arranged adjacent to the shaft 23 is a scale 36 which is calibrated with the scale 13, a pointer 37 on the guide carrier 26 being positioned to cooperate with said scale 36.

Loosely mounted upon the shaft 12 are a plurality of contact arms 38, each having an arcuate extension 39, provided with an angular extremity 40, positioned to rest upon the upper edge of the needle 35, when all of the parts are in zero position, as illustrated in Figure 1. Each of the arms 38 is provided with an electric contact 41, connected with suitable conductors 42. The pointer 11 is provided with an arm 43, which carries complemental contacts 44 positioned to successively engage the contacts 41, said contacts 44 being connected to a conductor 45. The conductors 42 and 45 serve to establish circuits to the current controlling switches (not shown).

A suitably supported adjustable stop 46 is provided for the purpose of rendering the device inoperative during any portion of the 15 minute or 30 minute interval of operation of cam 15, said stop having a lug 47 which cooperates to engage projections 48 on the arms 38.

In practice, the instrument may be calibrated by setting the arm 18 on the point or the cam at X, and then rotating the shaft 23 so as to raise or lower the rod 28 until the extremity of the pointer 35 lies over that portion of the scale 13 representing the maximum load demand for which it is desired to set the instrument. For instance, let it be assumed that the maximum demand is at the point 60 on the scale 13, the member 18 is moved so that its lower end comes opposite the position X on the cam 15 and then the shaft 23 is rotated to bring the pointer 35 to the position 60. This "60" indication can then be transferred to the scale 36 adjacent to the adjusting screw 23, for future calibration. In like manner, the entire scale from 10 to 100 may be transferred to the adjusting screw scale 36, which will then carry the same constant as the meter to which it is attached. Having in this manner calibrated the scales 13 and 36, let it now be assumed that the meter has a multiple of 50, in which event the maximum reading on the scale 13, as shown, would be 5000 K. W. H. If it is desired to set the demand at 3000 K. W. H., the shaft 23 is adjusted so as to bring the pointer 37 opposite the point 60 on the scale 36 and this will cause the pointer 35 to move to the position 60 on the scale 13, the movement of the pointer 35 being effected by reason of the co-action of the rack 32 and segment 34, because of the movement imparted by the bringing of the fork 29 closer to or further from the pivot 17, as the case may be. With this setting, the load limit needle 11 will go to the point 60 on scale 13 during each cycle of operation. Obviously, by changing the pointer 35 to any other position on the scale 36 will, through the adjustment of the position of the slide rod 38 fix a corresponding limitation on the operation of needle 11 with respect to the scale 13.

In operation, the follower 20 is moved along the horizontal guide 19 by the curved edge of the cam 15, and at the end of this travel is returned to zero position by the gravity of the entire mechanism. This cycle occurs once in each fifteen or thirty minutes, for instance, according to the calibration of shaft 10. The actuator arm 18 normally hangs vertically in its zero position and is swung outwardly by the follower 20. The slide rod 28 is moved by the arm 18, and is constrained to move rectilinearly by the guides 27. Movement of the rod 28 is imparted to the rack 32 and corresponding movement is imparted to the pointer 35 by reason of the engagement of the rack 32 with the segment 34. At the same time the pointer 11 is moving upwardly along the scale 13 by reason of the fact that the shaft 12 is being operated in a definite relation with respect to the shaft 10. If at any time during the cycle of operation of the cam 15, the load needle 11 catches up with the load limit needle 35 in its travel, so that the two come practically into register, it is an indication that the current being supplied is in excess of the maximum demands of the load. While the two needles are in register, a contact 44 will engage with the lowermost of the contacts 41, and thereby close the circuit to one of the switches which control the current supply, and if there is a tendency for the needle 11 to pass the needle 35, a contact 44 comes into engagement with the remaining contact 41, thereby effecting a corresponding reduction in the current being supplied. In other words, if the load consumption exceeds a predetermined rate, the pointer 11 overtakes the pointer 35 in their simultaneous movement over the scale 13. The instant that the pointer 11 overtakes the pointer 35, the contacts 41 and 44 are closed, deenergizing the circuit of the load consumption apparatus and permitting both pointers to drop simultaneously to their zero positions. If the load consumption exceeds the predetermined rate during the cycle of operation, the apparatus functions similarly to the conventional type of maximum load demand apparatus, and the pointer 11 is periodically returned to zero position at the end of each cycle. The cycle of operations is periodically repeated as long as the apparatus is connected in circuit.

Referring to Figure 2 of the drawing, 50 designates a cam secured to the timing shaft 10 of the maximum demand measuring instrument, said cam being engaged by an arm 51 formed integral with a tooth segment 52, pivotally mounted at 53. The segment 52 meshes with a complemental segment 53, loosely mounted upon the shaft 12, and provided with the load limit needle 54. The load needle 55 is secured to the shaft 12, and is provided with an arm 56 in which is mounted a contact 57 as shown. Loosely mounted upon the shaft 12 is an arm 58, provided with an angular extension 59, having a hooked end 60 resting upon the pointer 54, said arm 58 carrying a contact 61 complemental to the contact 57. A stop 62 is provided for rendering the device inoperative during any portion of the rotation cycle of the cam 50, if desired.

The advantages of the invention will be readily understood by those skilled in the art to which it belongs. It will be particularly noted that by means thereof it is possible to automatically and continuously regulate the maximum load demand for which the instrument may be set, during any period of operation. The device is simple in construction and may be readily attached to maximum demand measuring instruments now in use without requiring any change in the construction or operation of the latter, and may be readily adjusted to meet varying conditions of load and current.

Having thus explained the nature of the invention and described an operative manner of constructing and using the same, although without attempting to set forth all of the forms in which it may be made, or all of the forms of its use, what is claimed is:—

1. The combination with a maximum demand measuring instrument provided with a load needle, and means for imparting movement thereto, of a load limit needle operated independently of said load needle, and circuit controlling means rendered operative when said needles reach predetermined relative positions, so that the current in excess of the load limit will be cut out of the circuit.

2. The combination with a maximum demand measuring instrument provided with a load needle, and means for imparting movement thereto, of a load limit needle movable independently of said load needle, means for causing the operation of said demand needle to conform to predetermined periods of time, and circuit controlling means rendered operative when said needles reach predetermined relative position, so that the current in excess of the load limit will be cut out of the circuit.

3. The combination with a maximum demand measuring instrument provided with a load needle, and means for operating the same, of a load limit needle, a timing shaft, means on said timing shaft for imparting movement to said load limit needle independently of the operation of said load needle, and circuit controlling means rendered operative when said needles reach predetermined relative positions.

4. The combination with a maximum demand measuring instrument provided with a load needle, means for imparting movement thereto, and a timing shaft, of a load limit needle, a cam on said timing shaft having a uniform increase in radius, means operated by said cam for imparting movement to said load limit needle independently of the operation of said load needle, and circuit controlling means rendered operative when said needles reach predetermined relative positions.

5. The combination with a maximum demand measuring instrument provided with a load needle, and means for imparting movement thereto, of a movably mounted actuator member, a load limit needle movable independently of the load needle, means controlled by said actuator member for imparting movement to said load limit needle, and circuit controlling means rendered operative when said needles reach predetermined relative positions.

6. The combination with a maximum demand measuring instrument provided with a load needle, and means for imparting movement thereto, of a load limit needle operated independently of said load needle, a toothed segment connected with said load limit needle, a movably mounted actuator member, and means connected with said actuator member for engaging and moving said toothed segment.

7. The combination with a maximum demand measuring instrument provided with a load needle, means for imparting movement thereto, and a timing shaft, of a load limit needle movable independently of the load needle and provided with a toothed segment, a movably mounted actuator member having means associated therewith for engaging and operating said tooth segment, and a cam on said time shaft for operating said actuator member.

8. The combination with a maximum demand measuring instrument provided with a load needle, and means for imparting movement thereto, of a load limit needle movable independently of the load needle, a pivoted actuator member, a slide rod movably engaging said actuator member, means for adjusting said rod relative to the pivot of said actuator member, and means operated by said slide rod for actuating said load limit needle.

9. The combination with a maximum demand measuring instrument provided with a load needle, and means for imparting movement thereto, of a load limit needle operable independently of said load needle, a pivotally mounted actuator member, a slide rod having means engaging said actuator member, guide means for said slide rod, means for adjusting said guide means so as to move the point of engagement between said slide rod and said actuator member toward or from the pivot of said actuating member, and means operated by said slide rod for imparting movement to said load limit needle.

10. The combination with a maximum demand measuring instrument provided with a load needle, and means for imparting movement thereto, of a load limit needle operable independently of said load needle, a pivotally mounted actuator member, a rotatably mounted adjusting shaft, a guide carrier adjustable by said shaft and provided with bearings, a slide rod mounted in said bearings and having a movable engagement with said actuator member, a cam for oscillating said actuator member so as to impart movement to said slide rod, and means operated by said slide rod for imparting movement to said load limit needle.

11. The combination with a maximum demand measuring instrument provided with a load needle, and means for imparting movement thereto, of a load limit needle movable independently of said load needle, a rotatably mounted screw shaft, a guide carrier having a threaded portion complemental to the threads of said shaft, a slide rod supported by said carrier, means for effecting rectilinear movement of said slide rod as said guide carrier is adjusted along said shaft, means cooperating with the last mentioned means for causing timed reciprocations of said slide rod, and means operated by said slide rod for imparting movement to said load limit needle.

12. The combination with a maximum demand measuring instrument provided with a load needle, and means for imparting movement thereto, of a load limit needle movable independently of said load needle, a rotatably mounted screw shaft, a bearing carrier having a threaded bore complemental to said shaft, a slide rod supported by said carrier, means for effecting rectilinear adjustment of said slide rod in said carrier as the carrier is raised or lowered, means cooperating with the last mentioned means for causing timed reciprocations of said slide rod, a toothed segment connected with said load limit needle, a rack meshing with said segment, and means whereby movement of the slide rod is imparted to said rack.

13. The combination with a maximum demand measuring instrument provided with a load needle, and means for imparting movement thereto, of a load limit needle movable independently of said load needle, a pivotally mounted actuator member, a slide rod having a movable engagement with said actuating member, means for adjusting said slide rod toward and from the pivot of said actuator member, a toothed segment connected with said load limit needle, a slidable rack meshing with said segment, and means whereby movement of said slide rod is imparted to said rack.

14. The combination with a maximum demand measuring instrument provided with a load needle, and means for imparting movement thereto, of a load limit needle operated independently of said load needle, a pivotally supported depending actuator member, a threaded adjusting shaft, a guide carrier having a threaded bore complemental to said shaft, a slide rod supported by said carrier and having at one end a portion engaging said actuator member and at the other end an offset lug, a slidably supported rack provided with a shoulder positioned to be engaged by said arm, a toothed segment on said load limit needle meshing with said rack, and a cam for imparting oscillations to said actuator member.

15. The combination with a maximum demand measuring instrument provided with a load needle having an arm, and means for imparting movement to said needle, of a load limit needle operated independently of said load needle, a second arm having means to engage said load limit needle, and complemental circuit controlling contacts carried by said arms.

16. The combination with a maximum demand measuring instrument provided with a load needle having an arm, and means for imparting movement to said load needle, of a load limit needle operated independently of said load needle, a second movably mounted arm having a lateral extension provided with a shoulder adapted to engage said load limit needle, and complemental circuit controlling contacts carried by said arms.

17. The combination with a maximum demand measuring instrument provided with a load needle having an arm, and means for imparting movement to said needle, of a load limit needle operated independently of said load needle, a second arm having means to engage said load limit needle, complemental circuit controlling contacts carried by said arms, and adjusting means for controlling the period of engagement of the second arm with said load limit needle.

18. The combination with a maximum demand measuring instrument provided with a load needle having an arm, and means for imparting movement to said load needle, of a load limit needle operated independently of the load needle, a plurality of movably mounted contact arms each having means to engage the load limit needle, a contact carried by the load needle arm, and complemental contacts carried by the other arms.

19. The combination with a maximum demand measuring instrument provided with a load needle having an arm, and means for imparting movement to said load needle, of a load limit needle operated independently of the load needle, a plurality of contact arms each provided with segmental extensions having a bent over end adapted to engage said load limit needle, a contact carried by the load needle arm, and complemental contacts carried by the other arms.

20. The combination with a maximum demand measuring instrument provided with a load needle having an arm, and means for imparting movement to said load needle, of a load limit needle operated independently of the load needle, a plurality of contact arms each provided with a segmental extension having a bent over end adapted to engage said load limit needle, said arms being provided with shoulders, an adjustable abutment adapted to engage said shoulders, a contact carried by the load needle arm, and complemental contacts carried by the other arms.

In testimony whereof I have hereunto set my hand.

HERBERT S. BEAN.